United States Patent

Moellering

Patent Number: 5,410,932
Date of Patent: * May 2, 1995

[54] BALL LOCK PUNCH RETAINER

[76] Inventor: David J. Moellering, 22644 Shadowglen, Farmington Hills, Mich. 48355

[*] Notice: The portion of the term of this patent subsequent to Oct. 25, 2011 has been disclaimed.

[21] Appl. No.: 235,090

[22] Filed: Apr. 29, 1994

Related U.S. Application Data

[63] Continuation-in-part of Ser. No. 923,152, Jul. 29, 1992, Pat. No. D. 351,395, and Ser. No. 981,779, Nov. 25, 1992, Pat. No. 5,357,835.

[51] Int. Cl.⁶ .................................................. B26D 7/26
[52] U.S. Cl. ............................. 83/698.31; 83/698.91; 279/79; 403/327; 403/361
[58] Field of Search ......................... 83/698.31, 698.91; 403/326, 327, 328, 361; 279/79

[56] References Cited

U.S. PATENT DOCUMENTS

| | | | |
|---|---|---|---|
| 1,393,040 | 10/1921 | Richard et al. | 279/79 X |
| 1,621,811 | 3/1927 | Richard et al. | 403/327 X |
| 3,119,896 | 1/1964 | Vogel | 403/327 X |
| 3,589,226 | 5/1971 | Shadowen, Jr. | 83/698.31 X |

Primary Examiner—Richard K. Seidel
Assistant Examiner—Raymond D. Woods
Attorney, Agent, or Firm—James M. Deimen

[57] ABSTRACT

A ball lock punch and die retainer comprises a single piece body of high strength through hardened tool steel having a relieved flat bottomed borehole for the punch. The exterior sidewall of the retainer opposite the end having the punch borehole is substantially half-cylindrical. The oblique spring hole in the retainer body includes a circumferential undercut in the wall of the spring hole. The undercut mates with an enlarged portion of the spring to prevent the spring from pushing out of the hole.

13 Claims, 2 Drawing Sheets

BALL LOCK PUNCH RETAINER

This is a continuation-in-part of applications Ser. Nos. 07/923,152, filed on Jul. 29, 1992, now U.S. Pat. Des. No. 351,395 and Ser. No. 07/981,779, filed on Nov. 25, 1992, now U.S. Pat. No. 5,357,835.

BACKGROUND OF THE INVENTION

The field of the invention pertains to retainers for punches, the punches being used in punch presses in the stamping industry to form and pierce various materials. Punch retainers enable the punches to be accurately positioned with respect to the complementary die and to be quickly and easily replaced without loss of the accurate punch position at set-up.

Punch retainers are disclosed in a number of patents and other literature. U.S. Pat. No. 2,364,733 discloses circular punch and die retainers having an oblique threaded locking pin wedging a punch or die in position. Earlier U.S. Pat. No. 1,621,811 discloses punch and die retainers with an oblique spring loaded ball chamber. The ball is urged into engagement with a depression in the punch or die to retain the punch or die within the retainer. The ball is disengaged by an instrument inserted through a small port in the retainer. In the former patent the punch and die each directly abut the press platens and in the latter the punch and die abut hardened steel backing plates set in sockets in the press platens.

U.S. Pat. No. 3,563,124 discloses punch and die retainers having uniquely formed plugs acting as backing plates within the retainer. The backing plug also includes a centering device for the plug punch and retainer. U.S. Pat. No. 3,589,226 illustrates a ball detent retainer with the punch abutting the press platen. The ball detent spring is uniquely formed to wedge in the oblique borehole for the ball and spring.

More recently issued U.S. Pat. Nos. 4,558,620 and U.S. Pat. No. 5,038,599 disclose punch retainers having hardened backing plates fully separating the retainer body from the press platen. Locating dowel pins locate the backing plate with respect to the press platen and additional dowel pins and holes in the retainer body locate the retainer body relative to the backing plate in the former. In the latter the backing plate is permanently affixed to the retainer body before passages in the retainer for the dowel pins and punch are ground to final accuracy.

The addition of various backing plate configurations in most of the disclosures above adds an element of inaccuracy to the lateral position of the punch. In addition, the additional backing plate adds substantial part manufacturing time and assembly time to the manufacture of the complete retainer.

The external shape of the retainer is of importance to the versatility of the retainer where multiple punches are used. Most of the retainers available are round, substantially triangular or pentagonal. A summary of retainer shapes commercially available are shown in the specification sheets for TRULOCK TM retainers from Lane Punch Corporation and FDS TM retainers from Dayton Progress Corporation. The shape of the retainers determines how close together multiple punches may be fastened to the press platen.

The invention disclosed below comprises further improvements to the punch retainers. As noted above modern punch retainers are equipped with backing plugs or plates for the punches. The backing plugs or plates are of hardened steel to protect the press platens or die set from wear and impact damage. The separate bodies of the retainers are of alloy steel to reduce the cost and time to form the various holes and are subsequently casehardened before the final grinding step.

SUMMARY OF THE INVENTION

The new retainer comprises a single piece retainer of through hardened tool steel having a blind flat bottom borehole for the punch receptacle. The bottom of the blind hole protects the press platen or die set from wear and impact damage. The punch hole is counterbored at the bottom to eliminate any fillet with the sidewall and permit perfectly flat grinding to the periphery. The dowel pin hole centered on the centerline of the punch is formed directly in the retainer body thus eliminating a source of inaccuracy arising from the separate backing plug and backing plate described above.

The oblique spring hole in the retainer body includes a circumferential undercut in the wall of the spring hole. The undercut mates with an enlarged portion of the spring to prevent the spring from pushing out of the hole.

The unique external shape of the new retainer comprises substantially a half-circle or half-cylinder opposite the narrow punch nose of the retainer. The half-circle shape allows the retainers to be more closely placed on a platen and allows the retainers to be more easily and cheaply manufactured from bar stock.

DESCRIPTION OF THE PREFERRED EMBODIMENTS

Figure 1:
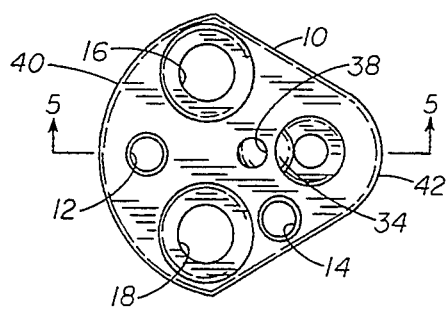
FIG. 1 is a top view of the new punch retainer.
Figure 2:
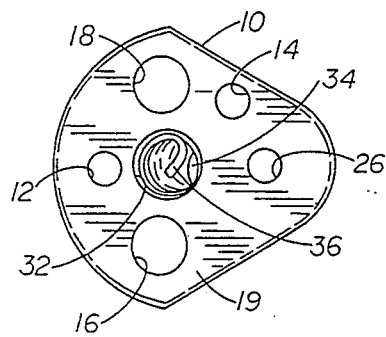
FIG. 2 is a bottom view of the new retainer.
Figure 3:
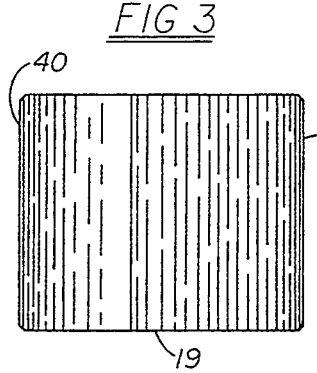
FIG. 3 is a front view of the new retainer.
Figure 4:
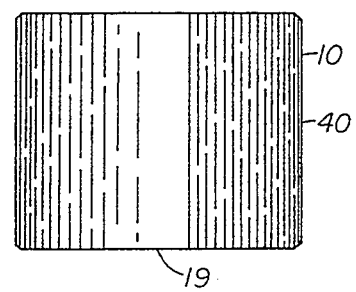
FIG. 4 is a back view of the new retainer.

FIGS. 1 through 5 illustrate the new retainer comprising a body 10 of through hardened tool steel. The retainer shown is typical of a large family of different sized retainers. The body 10 is pierced by a plurality of holes for various purposes. Holes 12 and 14 are dowel pin locating holes, one of which may be optional. Holes 16 and 18 are counterbored for bolts that hold the flat surface 19 of the retainer to the press platen or die set. The dowel pin locating holes 12 and 14 are partially threaded 20 for jack screws to lift the retainer off tight dowel pins. The thread 20 may also be used as an accessory attachment location.

Toward the nose 42 of the body 10 is a punch hole 22 that terminates at a circular flat bottom 24 within the body. The flat bottom 24 is pierced by a smaller hole 26 that completes the passage through the body 10. The hole 26 also comprises a dowel pin hole very accurately centered on the centerline 28 of the punch hole 22. To complete the punch hole 22 an undercut relief groove 30 is counterbored into the sidewall of the punch hole 22 just above the flat bottom 24. The groove 30 eliminates any fillet that otherwise might prevent a punch from properly seating on the flat bottom 24 and permits the flat bottom to be fully ground flat to the periphery of the bottom at the punch hole sidewall.

Figure 5:
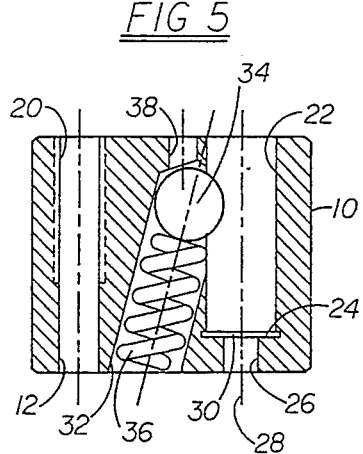
FIG. 5 is a cross-section of the new retainer taken along the line 5—5 of FIG. 1.

An oblique hole 32 intersects the punch hole 22. A ball 34 is urged by a spring 36 to partially enter the bore of the punch hole 22 as best shown in FIGS. 1 and 5. A small bore 38 extends into communication with the oblique hole 32 for the insertion of an instrument to move the ball 34 against the spring 36 and thereby release a punch located in the punch hole 22.

By the use of a through hardened tool steel body 10, the flat bottom 24 can accept the severe impact forces of a punch positioned against the flat bottom 24 and a separate hardened steel backing plate or plug is not required. Nevertheless, the tool steel body 10 can be formed by machining out the various holes and threading dowel pin holes 12 and 14 before through hardening and then final grinding the punch hole 22 and dowel pin holes 12, 14 and 26. The need for a separate backing plate is eliminated but the press platen or die set is properly protected.

Opposite the nose 42 of the body 10 is a semi-circular sidewall 40 that substantially approaches a full half-cylinder. The half-cylinder shape provides two advantages. Firstly, the half-cylinder 40 closely approaches the counterbored bolt holes 16 and 18 without significant loss of strength. Secondly, the body 10 may be formed of round bar stock of the same radius as the half-cylinder thereby saving the expense and material waste of forming the half-cylinder surface. Bar stock is the most economical form of tool steel for limited production runs.

In comparison with available retainers, the new retainer wastes less material and requires much less assembly without compromising its service life or versatility as a punch retainer. The new retainer has a smaller "foot print" for a given size of punch and is more accurate.

Figure 6:
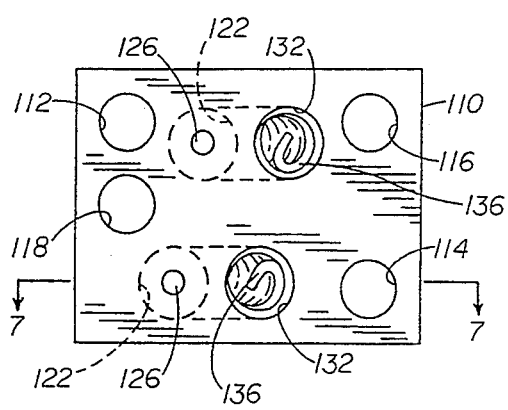
FIG. 6 is a top view of an alternative rectangular form of the new retainer for a pair of punches.
Figure 7:
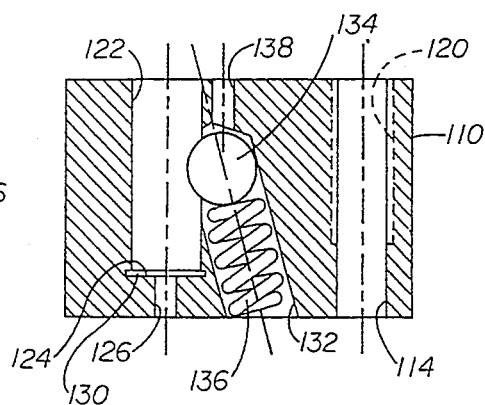
FIG. 7 is a cross-section of the alternative retainer taken along the line 7—7 of FIG. 6.

FIGS. 6 and 7 illustrate an alternate form of punch retainer comprising a body 110 having a pair of punch holes 122 for a pair of punches. The body 110 is of rectangular shape and includes a pair of counterbored bolt holes 116 and 118 and a pair of threaded 120 dowel pin holes 112 and 114. A pair of oblique holes 132 intersect the punch holes 122 and each contains a ball 134 and spring 136. Smaller holes 126 comprise relief holes for the manufacture of the punch holes 122. As above each punch hole 122 is formed with a flat bottom 124 and relief groove 130. The small bores 138 are threaded to permit a screw to be used to drive the balls out of engagement with the punches. While the rectangular version of the retainer does not provide the half-cylinder 40 advantages of the first embodiment, it does eliminate the need for a backing plate or plugs for the punches.

Figure 8:
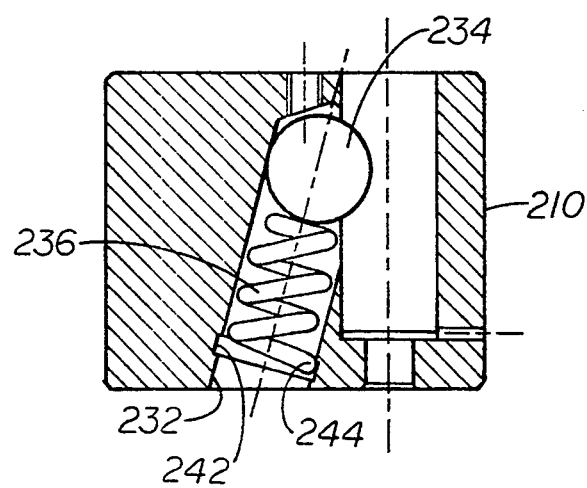
FIG. 8 is a cross-section of the new retainer showing the undercut in the spring hole.

In FIG. 8, the oblique spring hole 232 formed in the body 210 includes a circumferential undercut 242 spaced from the ball 234 by the spring 236. The spring 236 is slightly enlarged 244 at the undercut 242 so as to snap therein when the ball 234 and spring 236 are assembled into the body 210. The undercut 242 prevents the spring 236 from inadvertently pushing out of the spring hole 232.

I claim:

1. A punch retainer comprising a single piece solid body of through hardened tool steel,
   a flat surface on the body for engagement with a punch press platen and circumferential sidewalls on the body,
   at least one hole in the body for means to fasten the retainer to the press platen,
   at least one dowel pin hole in the body and intersecting the flat surface,
   at least one punch hole having a sidewall within the body for receipt of a punch and a hole intersecting the punch hole, said intersecting hole having a ball and spring therein, the spring urging the ball at least partially into the punch hole,
   the improvement comprising a flat bottom within the body terminating the punch hole and extending about a smaller hole, the smaller hole extending through to the flat surface, and a relief groove in the punch hole sidewall adjacent the flat bottom.
   and further including an undercut in the intersecting hole and means on the spring to engage the undercut.

2. The punch retainer of claim 1 wherein the punch hole is adjacent one end of the body and the circumferential sidewalls of the body are perpendicular to the flat surface, a sidewall at an end of the body farthest from the punch hole being substantially half-cylindrical.

3. The punch retainer of claim 1 wherein said at least one dowel pin hole is partially threaded.

4. The punch retainer of claim 1 containing a plurality of punch holes, each punch hole having a flat bottom therein and a hole extending through to the flat surface.

5. The punch retainer of claim 4 wherein the sidewall of each punch hole is grooved adjacent the flat bottom.

6. The punch retainer of claim 1 wherein the smaller hole comprises a dowel pin hole.

7. A punch retainer comprising a single piece solid body of steel,
   a flat surface on the body for engagement with a punch press platen,
   at least one hole in the body for means to fasten the retainer to the press platen,
   at least one dowel pin hole in the body and intersecting the flat surface,
   at least one punch hole for receipt of a punch and means to retain a punch therein,
   a circumferential sidewall about the body with the punch hole located adjacent a relatively narrow end of the body and,
   a substantially half-cylindrical sidewall surface on the body at an end farthest from the narrow end, the half-cylindrical sidewall surface being perpendicular to the flat surface,
   and wherein the means to retain a punch therein include a hole intersecting the punch hole and a spring in the intersecting hole, the intersecting hole including an undercut and the spring including means to engage the undercut.

8. The punch retainer of claim 7 wherein the maximum dimension of the body parallel to the flat surface of the body is not more than twice the radius of the half-cylindrical surface.

9. The punch retainer of claim 7 wherein each one of a pair of holes for the fastening means is located adjacent a juncture of the half-cylindrical sidewall surface with a remaining portion of the circumferential sidewall extending toward the narrow end of the body.

10. A punch retainer comprising a single piece solid body of through hardened tool steel, a flat surface on the body for engagement with a punch press platen and circumferential sidewalls on the body, at least one hole in the body for means to attach the retainer to the press platen, at least one dowel pin hole in the body and intersecting the flat surface, at least one punch hole having a sidewall within the body for receipt of a punch and punch retention means extendable into the punch hole, the improvement comprising a flat bottom terminating the punch hole within the body, and a relief groove formed in the punch hole sidewall adjacent the flat bottom, and wherein the punch retention means include a hole intersecting the punch hole and a spring in the intersecting hole, the intersecting hole including an undercut and the spring including means to engage the undercut.

11. The punch retainer of claim 10 including a smaller hole extending between the flat bottom and the flat surface on the body.

12. The punch retainer of claim 11 wherein the smaller hole is coaxial with the punch hole and is formed as a dowel pin hole.

13. The punch retainer of claim 10 wherein the punch hole is adjacent one end of the body and the circumferential sidewalls of the body are perpendicular to the flat surface, a sidewall at an end of the body farthest from the punch hole being substantially half-cylindrical.

* * * * *